United States Patent
Kanazawa

(10) Patent No.: US 9,366,854 B2
(45) Date of Patent: Jun. 14, 2016

(54) RE-IMAGING OPTICAL SYSTEM

(71) Applicant: OLYMPUS CORPORATION, Tokyo (JP)

(72) Inventor: Akari Kanazawa, Saitama (JP)

(73) Assignee: OLYMPUS CORPORATION, Tokyo (JP)

(*) Notice: Subject to any disclaimer, the term of this patent is extended or adjusted under 35 U.S.C. 154(b) by 0 days.

(21) Appl. No.: 14/922,111

(22) Filed: Oct. 23, 2015

(65) Prior Publication Data
US 2016/0041382 A1    Feb. 11, 2016

Related U.S. Application Data

(63) Continuation of application No. PCT/JP2014/079023, filed on Oct. 31, 2014.

(30) Foreign Application Priority Data

Nov. 14, 2013  (JP) .................. 2013-235950

(51) Int. Cl.
| | | |
|---|---|---|
| G02B 13/22 | (2006.01) | |
| G02B 21/02 | (2006.01) | |
| G02B 9/12 | (2006.01) | |
| G02B 9/06 | (2006.01) | |
| G02B 23/24 | (2006.01) | |
| G02B 13/24 | (2006.01) | |

(52) U.S. Cl.
CPC ............ G02B 23/2453 (2013.01); G02B 13/22 (2013.01); G02B 13/24 (2013.01); G02B 23/243 (2013.01)

(58) Field of Classification Search
CPC .............. G02B 9/04; G02B 9/06; G02B 9/12; G02B 13/003; G02B 13/0035; G02B 13/22; G02B 21/02; G02B 23/243; G02B 23/2453

USPC .......... 359/661, 663, 753, 784, 791, 793, 794
See application file for complete search history.

(56) References Cited

U.S. PATENT DOCUMENTS 5,731,910 A    3/1998    Baumann

FOREIGN PATENT DOCUMENTS

| JP | 08-510567 | 11/1996 |
|---|---|---|
| JP | 2001-337271 | 12/2001 |
| JP | 2003-084214 | 3/2003 |

(Continued)

OTHER PUBLICATIONS

International Search Report, dated Jan. 13, 2015, issued in corresponding International Application No. PCT/JP2014/079023.

*Primary Examiner* — William Choi
(74) *Attorney, Agent, or Firm* — Kenyon & Kenyon LLP

(57) ABSTRACT

A re-imaging optical system is an object side telecentric optical system and includes a front group having a positive refractive power, an aperture stop, and a rear group having a positive refractive power, in this order from the object side, wherein the rear group is composed of a positive lens disposed on the object side and a negative lens disposed on an image side, each of the positive lens and the negative lens is formed of a single lens or a cemented lens, and conditional expressions (1) and (2) are satisfied. Here, fR1 is the focal distance of the negative lens, f is the focal distance of an entire system, and L is a total length from an object surface to an image surface:

$$-2.2 < fR1/f < -0.79 \tag{1}$$

$$-0.5 < fR1/L < -0.15. \tag{2}$$

2 Claims, 19 Drawing Sheets

(56) References Cited

FOREIGN PATENT DOCUMENTS

| | | |
|---|---|---|
| JP | 2007-192973 | 8/2007 |
| JP | 2009-103874 | 5/2009 |
| JP | 4290923 | 7/2009 |
| JP | 2009-192562 | 8/2009 |
| JP | 2009-204997 | 9/2009 |
| JP | 2009-216858 | 9/2009 |
| JP | 2009-251520 | 10/2009 |
| JP | 2010-107531 | 5/2010 |
| JP | 4588077 | 11/2010 |

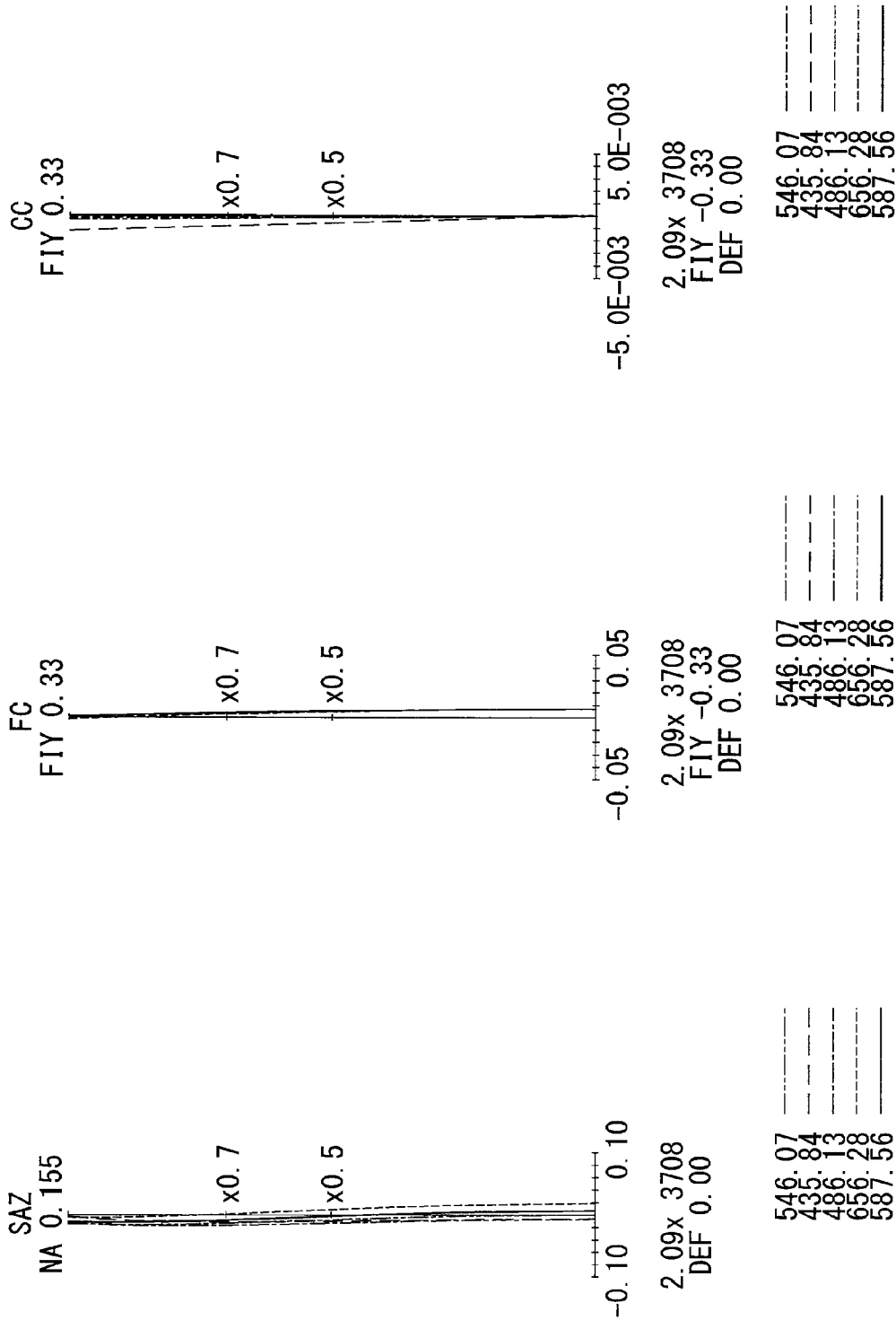

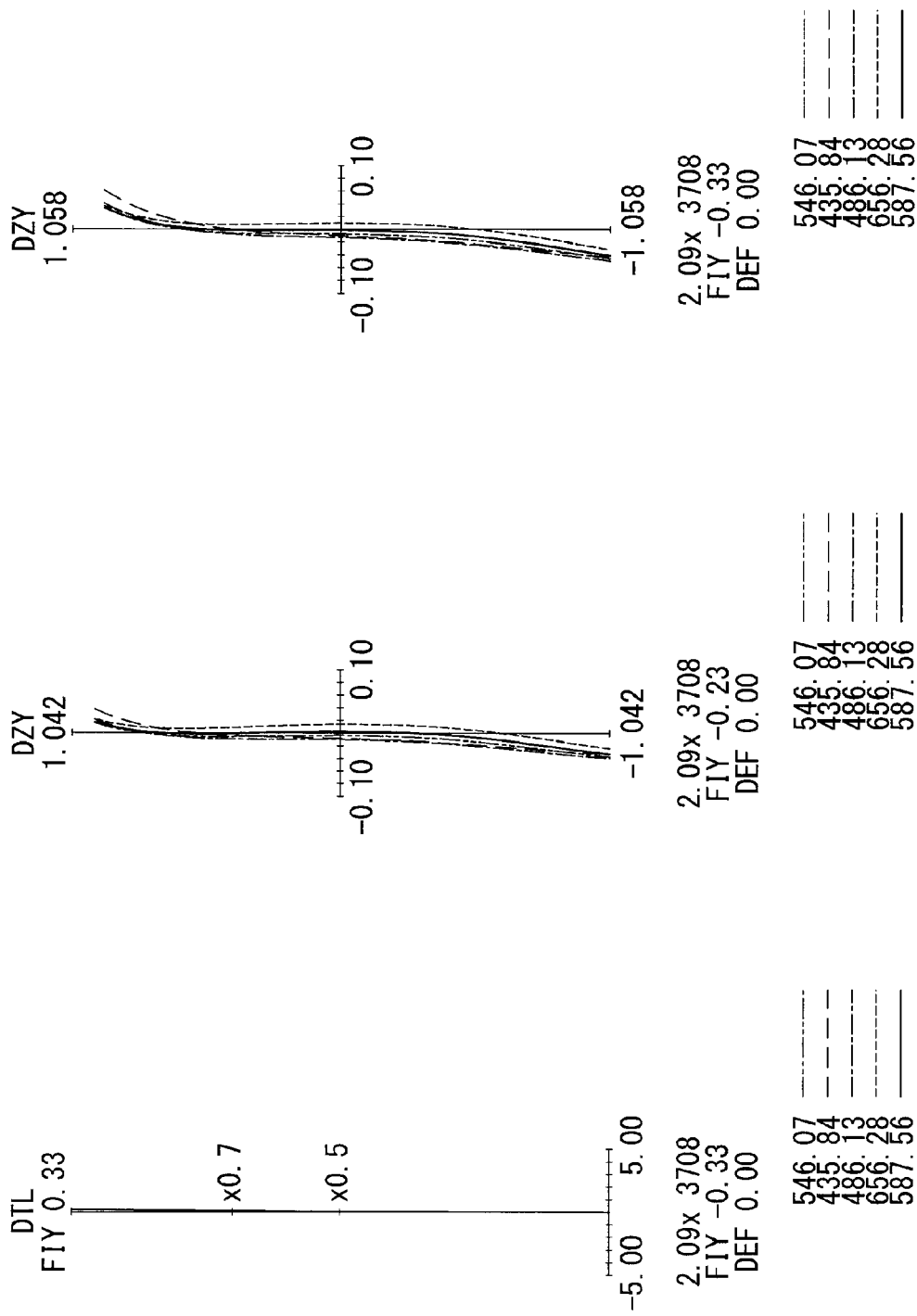

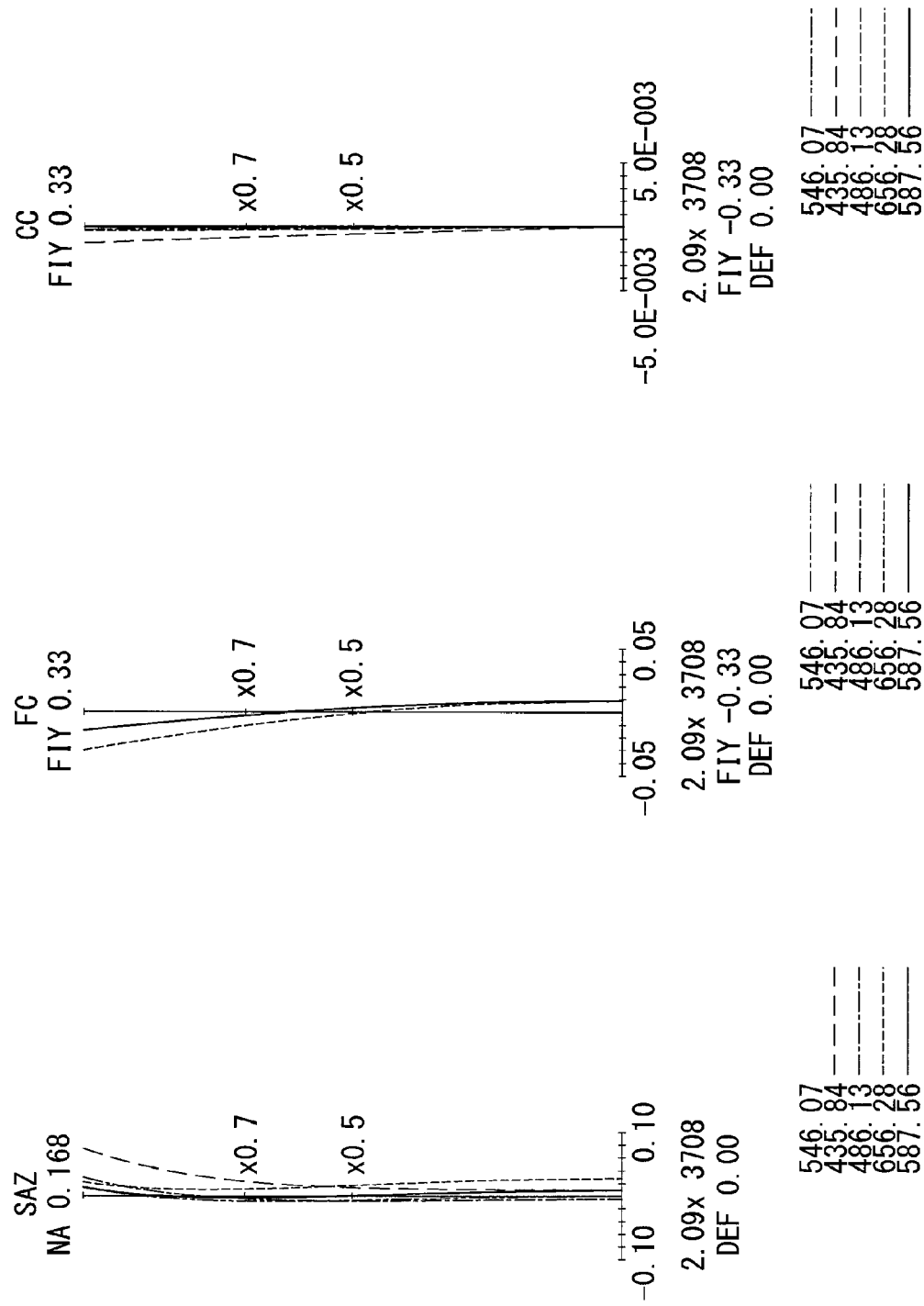

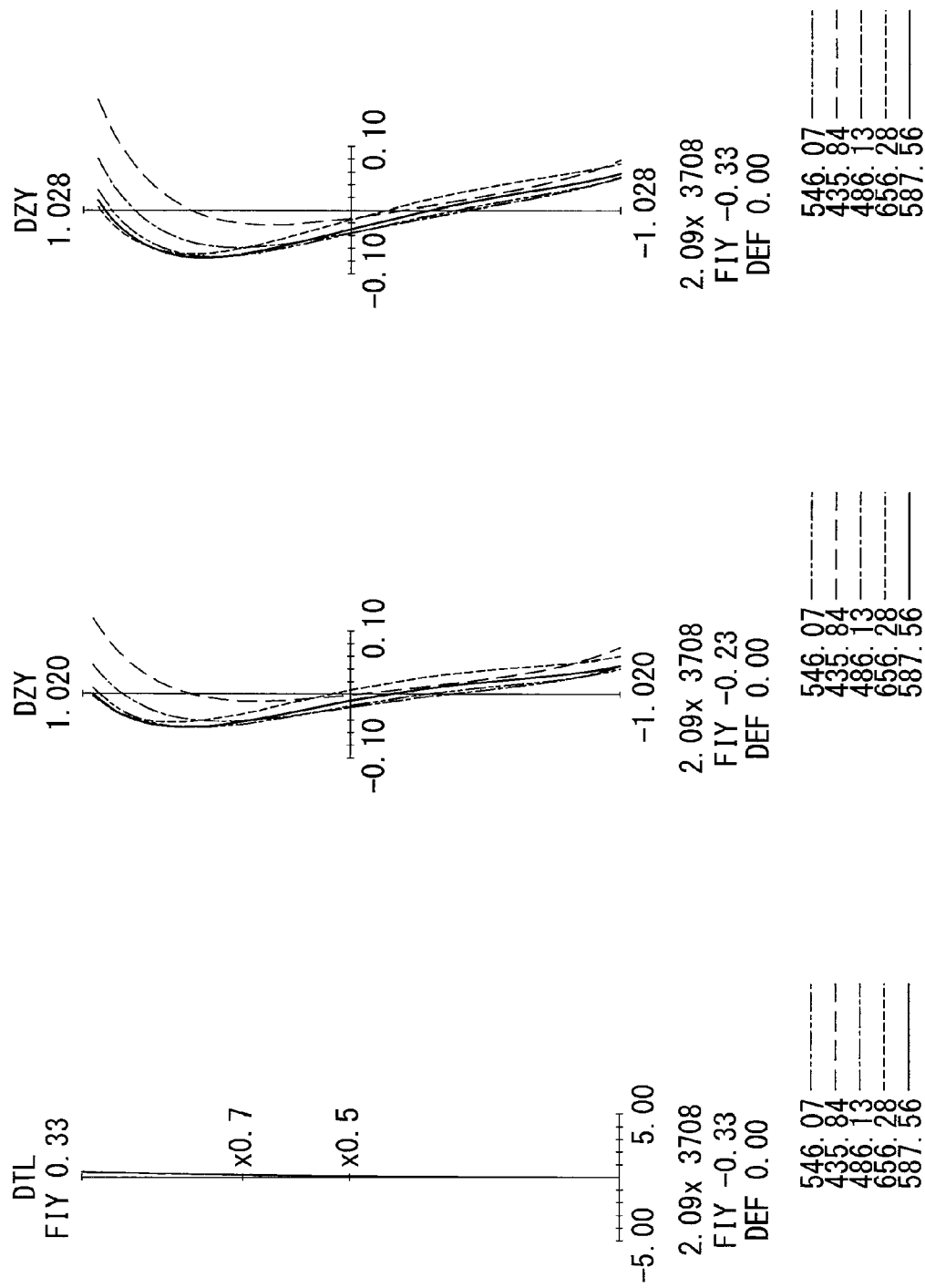

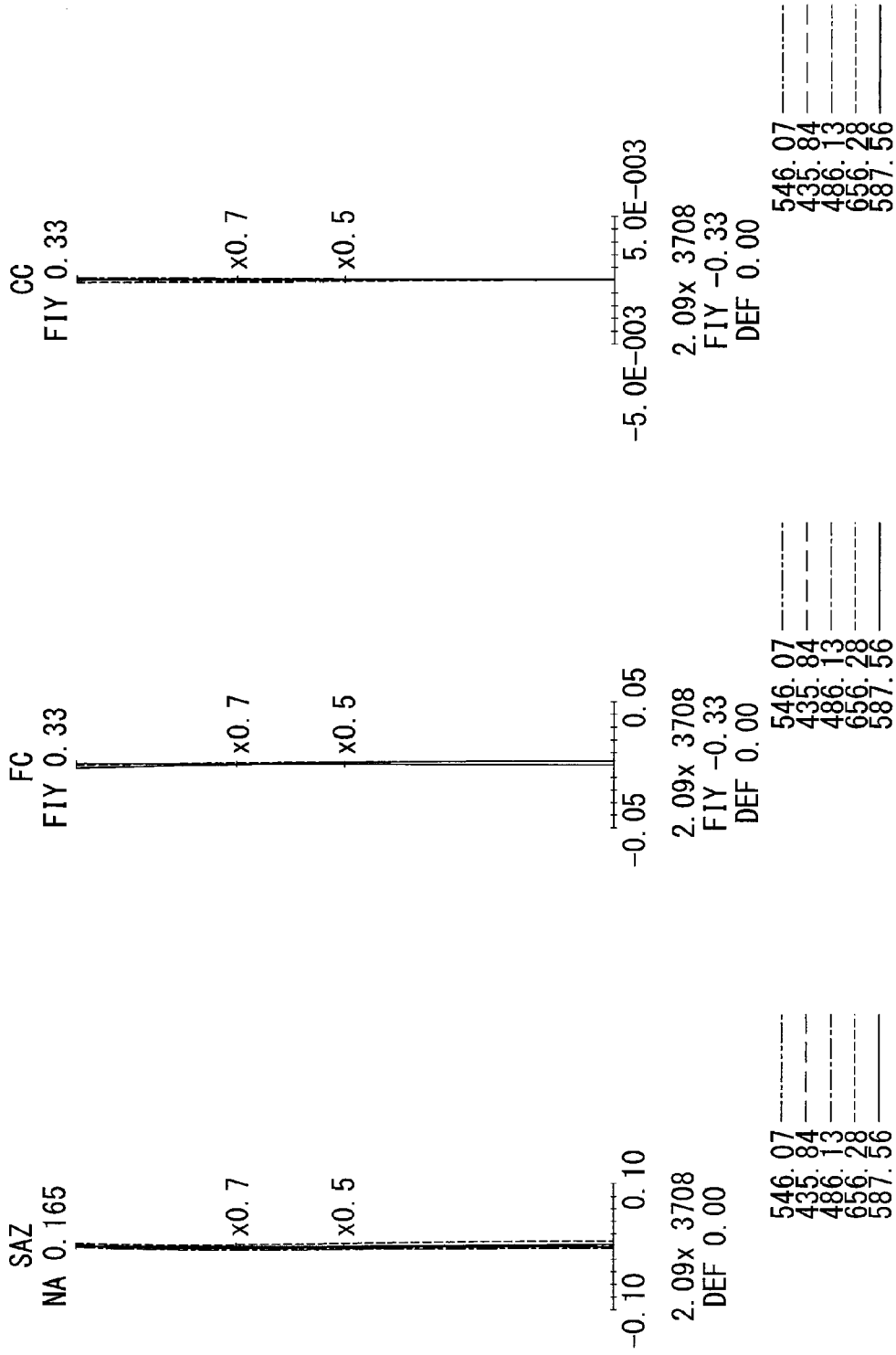

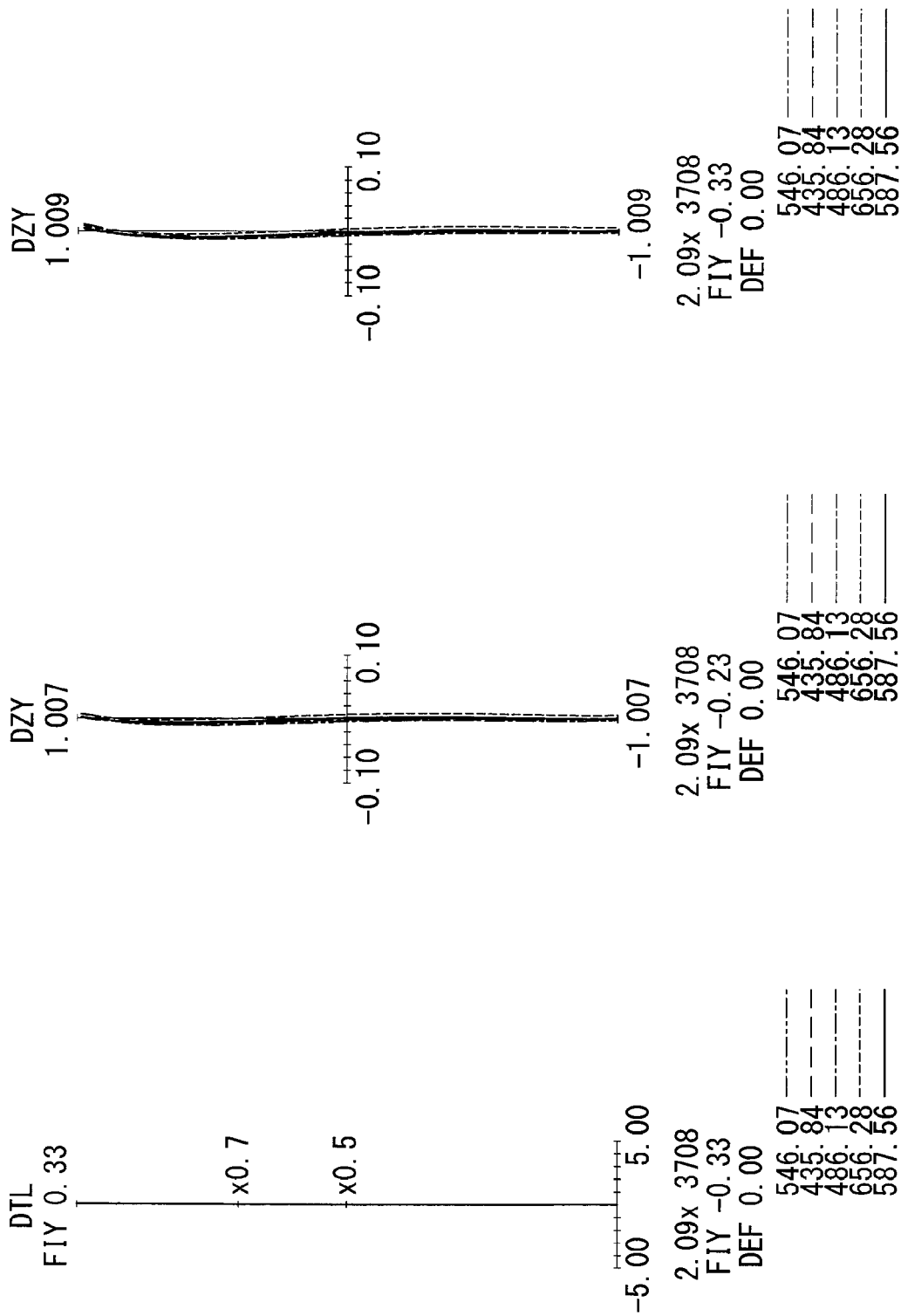

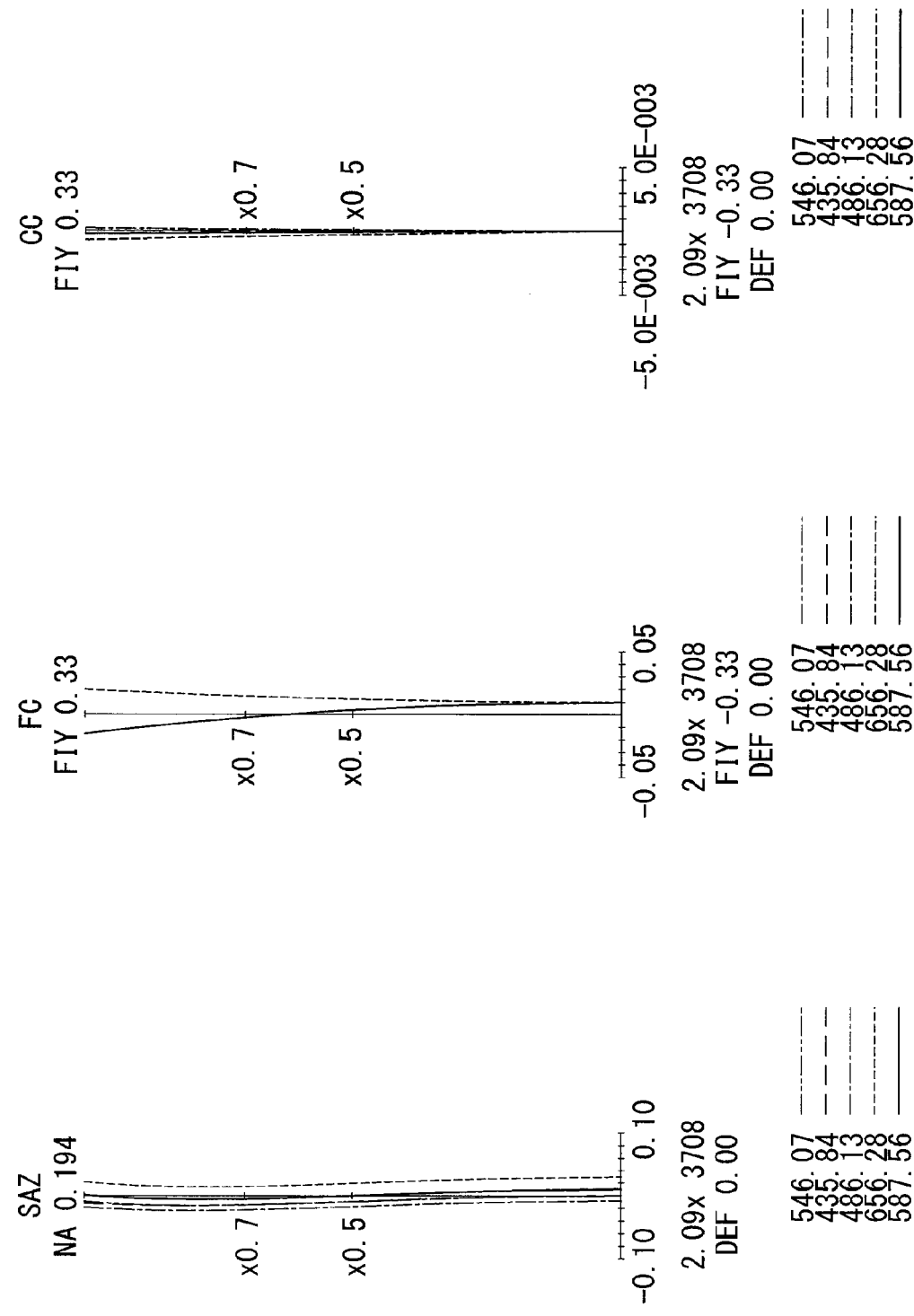

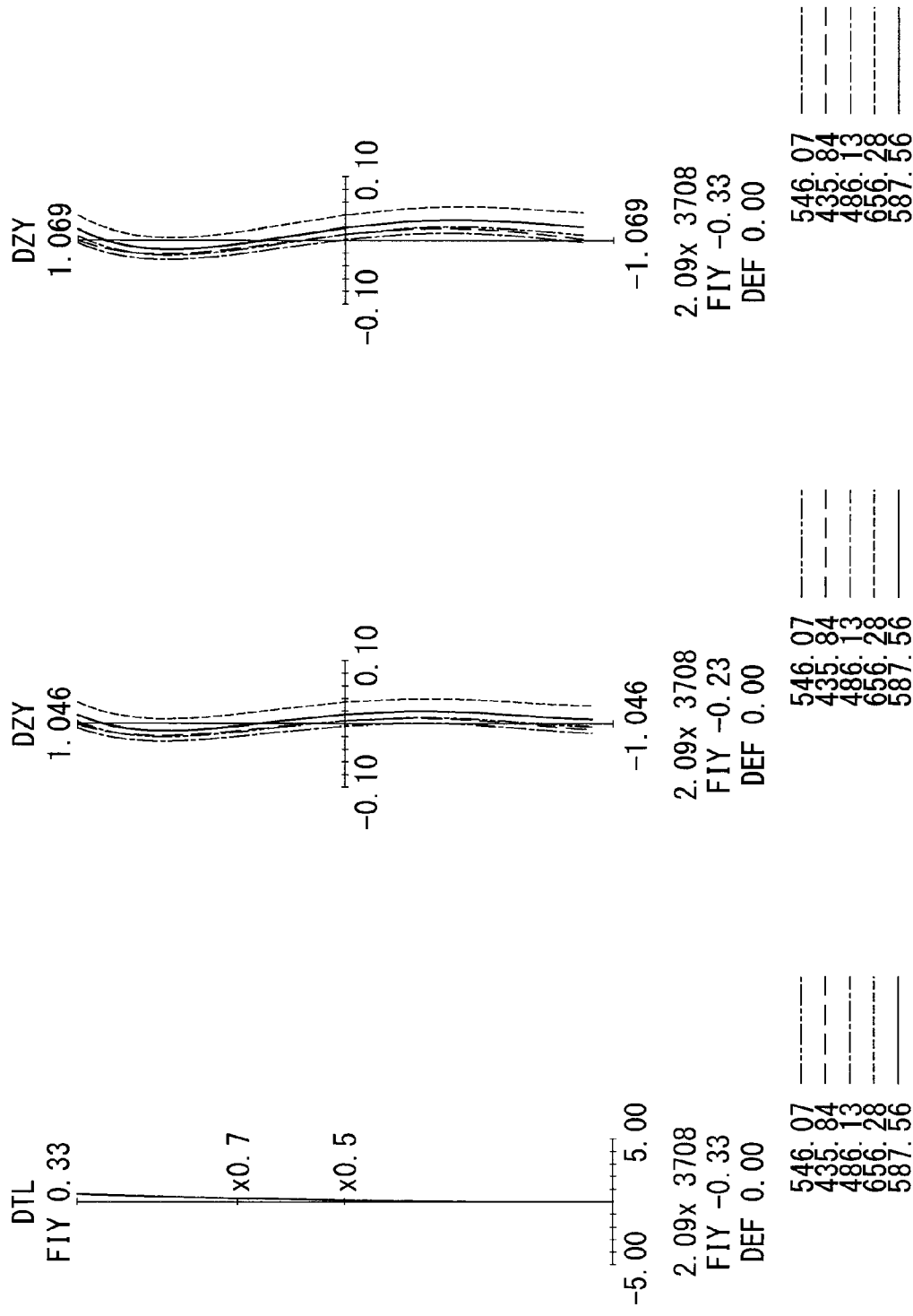

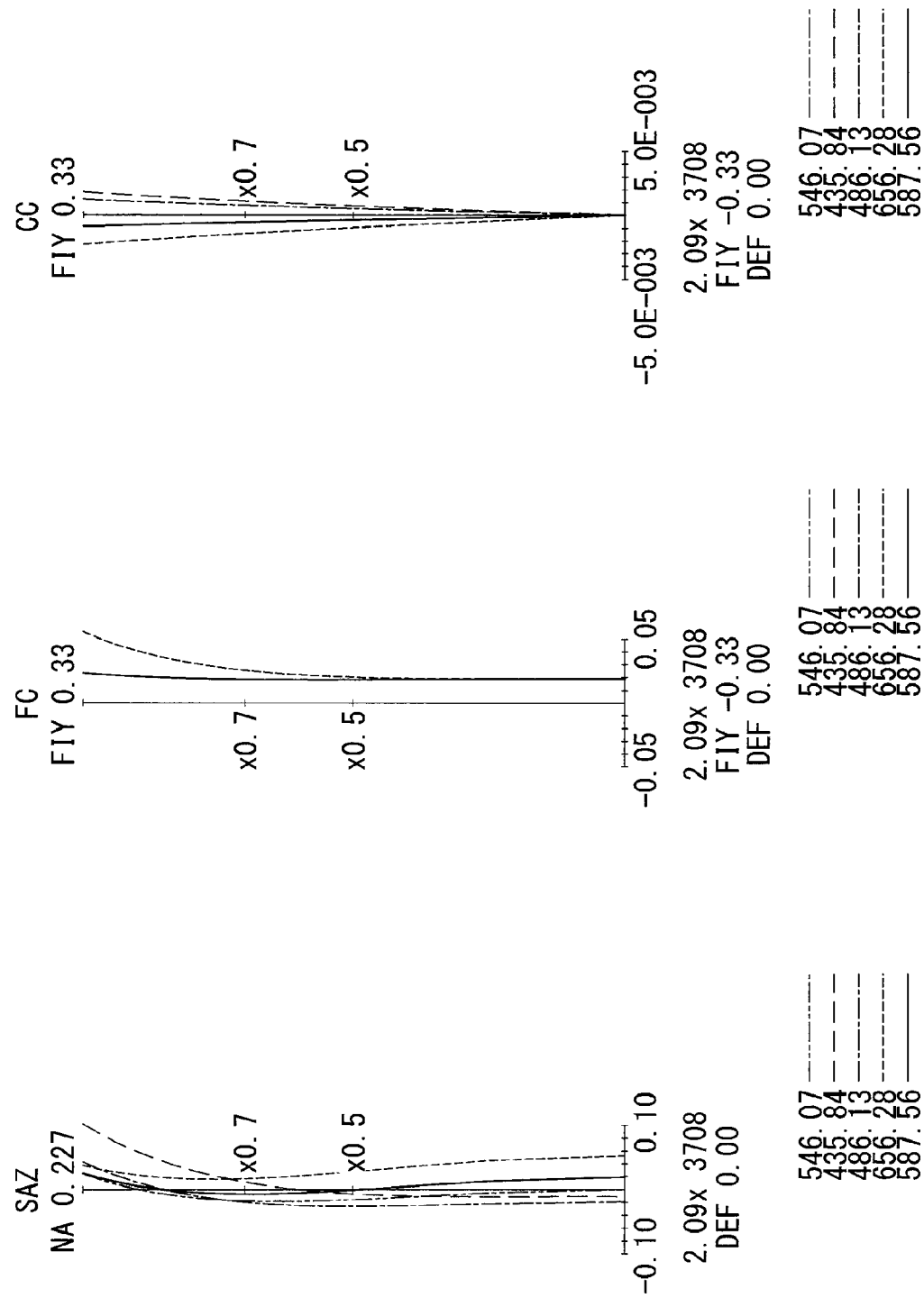

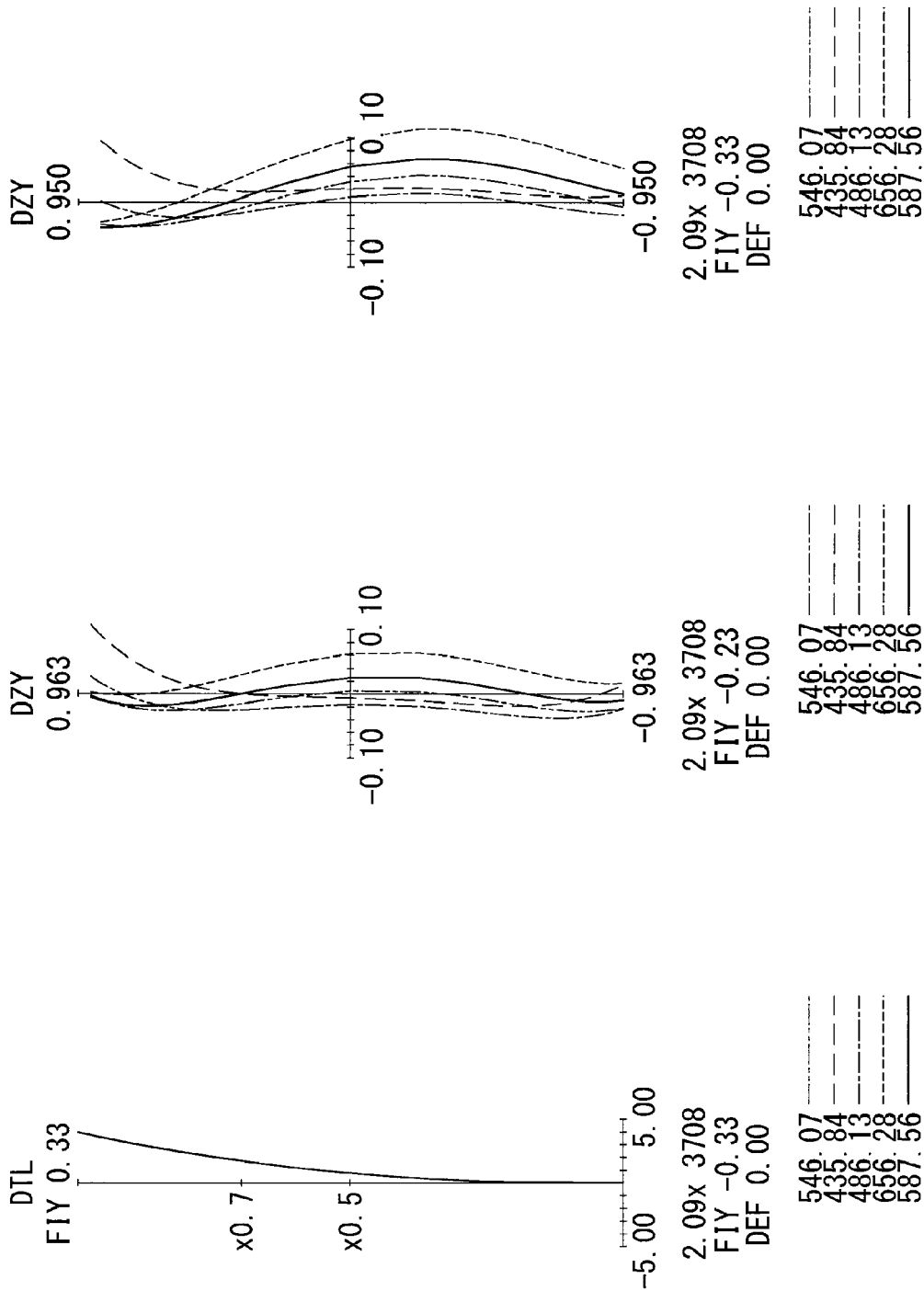

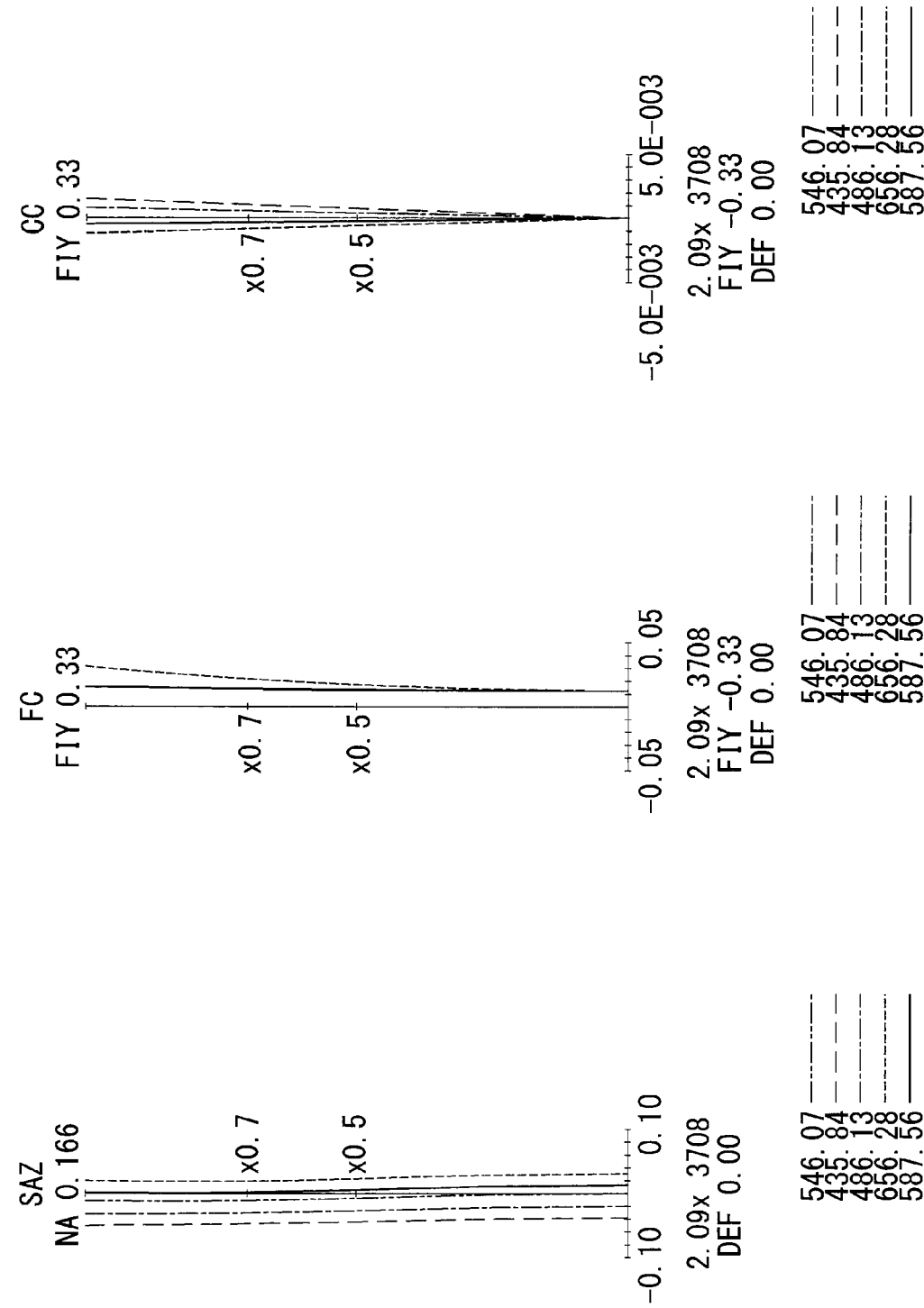

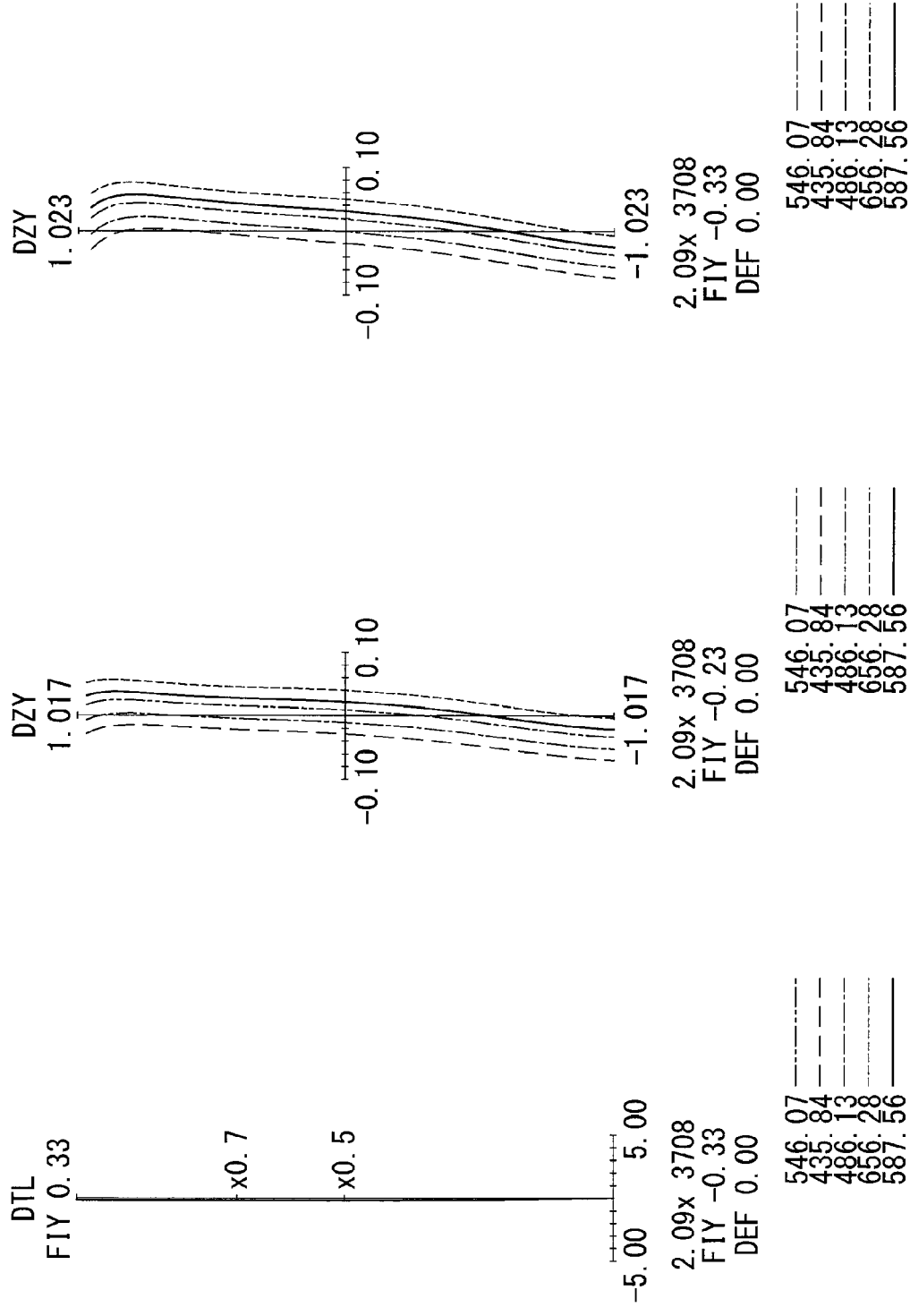

RE-IMAGING OPTICAL SYSTEM

CROSS-REFERENCE TO RELATED APPLICATIONS

This is a continuation of International Application PCT/JP2014/079023, with an international filing date of Oct. 31, 2014, which is hereby incorporated by reference herein in its entirety. This application claims the benefit of Japanese Patent Application No. 2013-235950, filed on Nov. 14, 2013, the content of which is incorporated herein by reference.

TECHNICAL FIELD

The present invention relates to a re-imaging optical system, and relates in particular to an endoscope re-imaging optical system that causes a compact solid-state image-acquisition device to re-form a subject image transmitted by an image guide.

BACKGROUND ART

In the related art, there are known hybrid endoscopes in which an image guide and a solid-state image-acquisition device are combined (for example, see Patent Literature 1). Such an endoscope is provided with an image guide that passes through an inserted portion and a re-imaging optical system and a solid-state image-acquisition device installed in a manipulation portion, transmits a subject image formed by an objective optical system via the image guide, and acquires an image of the subject by re-forming the transmitted subject image at the solid-state image-acquisition device by means of the re-imaging optical system. As compared with an endoscope in which a solid-state image-acquisition device is disposed at the distal end of the inserted portion, a hybrid endoscope has an advantage in that it is possible to reduce the size of the distal end of the inserted portion. There is also an advantage in that, in the case in which an image needs to be displayed on a monitor so that more than one person can observe the image, a hybrid endoscope is easier to use as compared with a fiber scope, to which a camera must be attached.

CITATION LIST

Patent Literature

{PTL 1} Publication of Japanese Patent No. 4290923
{PTL 2} Publication of Japanese Patent No. 4588077

SUMMARY OF INVENTION

An aspect of the present invention is a re-imaging optical system that is provided between an image guide and a solid-state image-acquisition device and that re-forms an image transmitted through the image guide at the solid-state image-acquisition device, the re-imaging optical system being an object side telecentric optical system and comprising: a front group; an aperture stop; and a rear group, in this order from an object side, wherein the front group has a positive refractive power as a whole, the rear group is composed of two groups that are a positive lens disposed on the object side and a negative lens disposed on an image side, and has a positive refractive power as a whole, each of the positive lens and the negative lens is formed of a single lens or a cemented lens, and conditional expressions (1) and (2) below are satisfied:

$$-2.2 < fR1/f < -0.79, \quad (1)$$

$$-0.5 < fR1/L < -0.15, \quad (2)$$

where fR1 is a focal distance of the negative lens, f is a focal distance of an entire system, and L is a total length from an object surface to an image surface.

BRIEF DESCRIPTION OF DRAWINGS

FIG. 3A shows spherical aberration of the re-imaging optical system in FIG. 2.

FIG. 3B shows astigmatism of the re-imaging optical system in FIG. 2.

FIG. 3C shows chromatic aberration of magnification of the re-imaging optical system in FIG. 2.

FIG. 3D shows distortion of the re-imaging optical system in FIG. 2.

FIG. 3E shows comatic aberration (maximum image height) of the re-imaging optical system in FIG. 2.

FIG. 3F shows comatic aberration (intermediate image height) of the re-imaging optical system in FIG. 2.

FIG. 5A shows spherical aberration of the re-imaging optical system in FIG. 4.

FIG. 5B shows astigmatism of the re-imaging optical system in FIG. 4.

FIG. 5C shows chromatic aberration of magnification of the re-imaging optical system in FIG. 4.

FIG. 5D shows distortion of the re-imaging optical system in FIG. 4.

FIG. 5E shows comatic aberration (maximum image height) of the re-imaging optical system in FIG. 4.

FIG. 5F shows comatic aberration (intermediate image height) of the re-imaging optical system in FIG. 4.

FIG. 7A shows spherical aberration of the re-imaging optical system in FIG. 6.

FIG. 7B shows astigmatism of the re-imaging optical system in FIG. 6.

FIG. 7C shows chromatic aberration of magnification of the re-imaging optical system in FIG. 6.

FIG. 7D shows distortion of the re-imaging optical system in FIG. 6.

FIG. 7E shows comatic aberration (maximum image height) of the re-imaging optical system in FIG. 6.

FIG. 7F shows comatic aberration (intermediate image height) of the re-imaging optical system in FIG. 6.

FIG. 9A shows spherical aberration of the re-imaging optical system in FIG. 8.

FIG. 9B shows astigmatism of the re-imaging optical system in FIG. 8.

FIG. 9C shows chromatic aberration of magnification of the re-imaging optical system in FIG. 8.

FIG. 9D shows distortion of the re-imaging optical system in FIG. 8.

FIG. 9E shows comatic aberration (maximum image height) of the re-imaging optical system in FIG. 8.

FIG. 9F shows comatic aberration (intermediate image height) of the re-imaging optical system in FIG. 8.

FIG. 11 shows spherical aberration of the re-imaging optical system in FIG. 10.

FIG. 11B shows astigmatism of the re-imaging optical system in FIG. 10.

FIG. 11C shows chromatic aberration of magnification of the re-imaging optical system in FIG. 10.

FIG. 11D shows distortion of the re-imaging optical system in FIG. 10.

FIG. 11E shows comatic aberration (maximum image height) of the re-imaging optical system in FIG. 10.

FIG. 11F shows comatic aberration (intermediate image height) of the re-imaging optical system in FIG. 10.

FIG. 13A shows spherical aberration of the re-imaging optical system in FIG. 12.

FIG. 13B shows astigmatism of the re-imaging optical system in FIG. 12.

FIG. 13C shows chromatic aberration of magnification of the re-imaging optical system in FIG. 12.

FIG. 13D shows distortion of the re-imaging optical system in FIG. 12.

FIG. 13E shows comatic aberration (maximum image height) of the re-imaging optical system in FIG. 12.

FIG. 13F shows comatic aberration (intermediate image height) of the re-imaging optical system in FIG. 12.

DESCRIPTION OF EMBODIMENT

A re-imaging optical system 1 according to an embodiment of the present invention will be described below with reference to FIG. 1.

The re-imaging optical system 1 according to this embodiment is installed in a manipulation portion of a hybrid endoscope. The hybrid endoscope is provided with an elongated inserted portion that is inserted into an examination subject, such as a living organism, and a manipulation portion that is provided at the base end of the inserted portion. The inserted portion includes an objective optical system provided at the distal end thereof and an image guide 2 that extends over almost the entire length thereof, and transmits a subject image formed by the objective optical system to the re-imaging optical system 1 in the manipulation portion via the image guide 2. The re-imaging optical system 1 according to this embodiment is provided between the image guide 2 and a solid-state image-acquisition device 3 and forms the subject image received via the image guide 2 on an image-acquisition surface 3a of the solid-state image-acquisition device 3.

Figure 1:
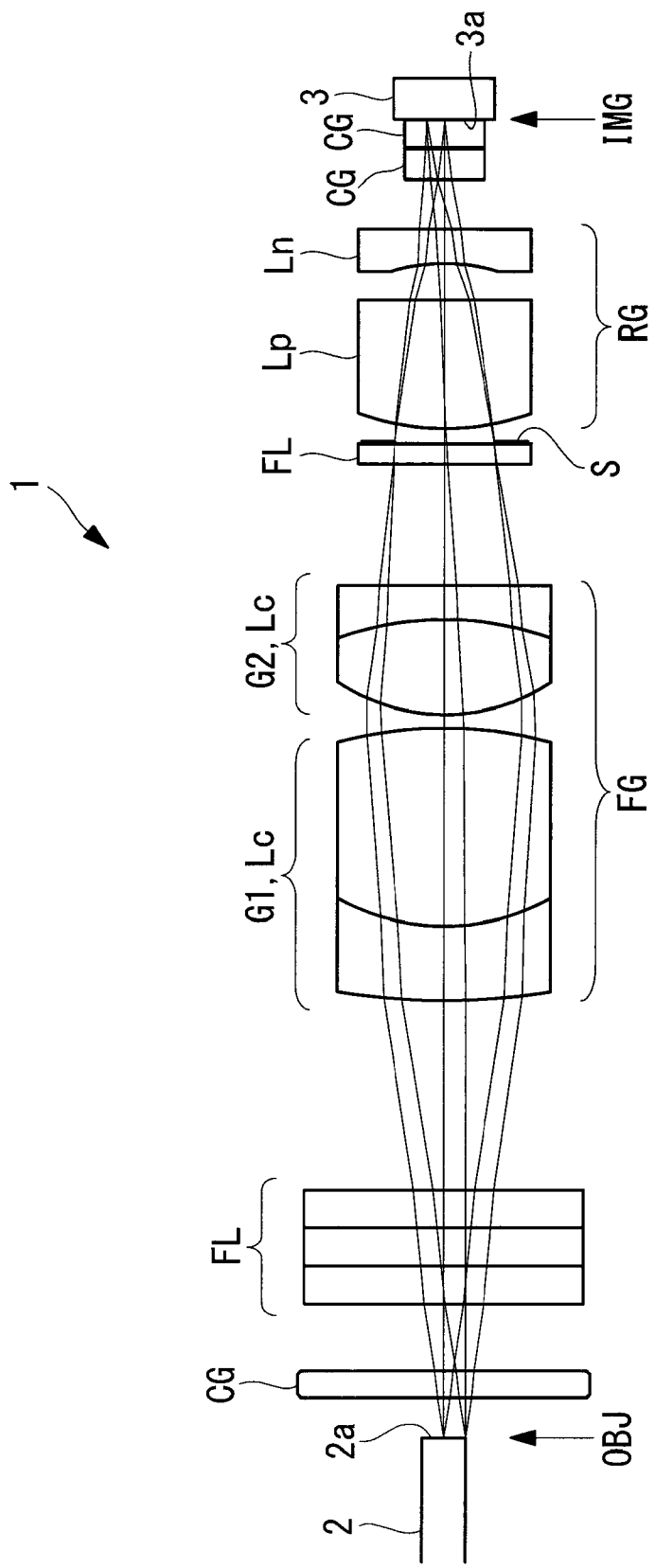
FIG. 1 is a sectional lens diagram showing the overall configuration of a re-imaging optical system according to an embodiment of the present invention.

Specifically, as shown in FIG. 1, the re-imaging optical system 1 is provided with a front group FG, an aperture stop S, and a rear group RG in this order from the object side, thereby forming an object-side telecentric optical system.

Reference sign FL indicates an optical filter, and reference sign CG indicates a cover glass. In addition, reference sign OBJ indicates an object surface of the re-imaging optical system 1, and a base-end surface 2a of the image guide 2 is disposed at the position of the object surface OBJ. Reference sign IMG indicates an image surface of the re-imaging optical system 1, and an image-acquisition surface 3a of the solid-state image-acquisition device 3 is disposed at the position of the image surface IMG.

The front group FG is formed of a first group G1 and a second group G2 in this order from the object side, and has a positive refractive power as a whole. It is preferable that at least one of the first group G1 and the second group G2 be a cemented lens Lc having a positive refractive power, and it is more preferable that both be cemented lenses Lc having positive refractive powers, as in this Example. By including the cemented lens(es) Lc, it is possible to satisfactorily correct the chromatic aberration of magnification.

The rear group RG is formed of a positive lens Lp and a negative lens Ln in this order from the object side, and has a positive refractive power as a whole. Although FIG. 1 shows the positive lens Lp and the negative lens Ln, each of which is formed of a single lens, alternatively, the positive lens Lp and the negative lens Ln may each be formed of a cemented lens.

The re-imaging optical system 1 satisfies conditional expressions (1) to (3) described below:

$$-2.2 < fR1/f < -0.79, \quad (1)$$

$$-0.5 < fR1/L < -0.15, \text{ and} \quad (2)$$

$$0.25 < |FB|/|FF| < 4, \quad (3)$$

where fR1 is the focal distance (mm) of the negative lens Ln, f is the focal distance (mm) of the entire system, L is the distance (mm) from the object surface OBJ to the image surface IMG, FB is the distance (mm) from the image surface IMG to a rear-side focal position of the entire system, and FF is the distance (mm) from the object surface OBJ to a front-side focal position of the entire system.

Next, the operation of the thus-configured re-imaging optical system 1 will be described.

A subject image formed by the objective optical system is transmitted by the image guide 2, is made to enter the re-imaging optical system 1 from the base-end surface 2a of the image guide 2, and is formed on the image-acquisition surface 3a of the solid-state image-acquisition device 3 by the effects of the positive refractive powers possessed by the front group FG and the rear group RG. At this time, individual rays are made obliquely incident on the image-acquisition surface 3a by the effect of the negative lens Ln positioned closest to the image side.

In this case, with this embodiment, by satisfying conditional expressions (1) and (2), it is possible to reduce the overall length of the re-imaging optical system 1, thus achieving a compact configuration. Furthermore, it is possible to satisfactorily ensure oblique enough incident angles (angles formed between rays and the optical axis) for the rays that are made incident on the image-acquisition surface 3a, and thus, it is possible to suitably apply the re-imaging optical system 1 also to a compact solid-state image-acquisition device 3 having oblique incidence characteristics. Specifically, the compact solid-state image-acquisition device 3 in which the length of the image-acquisition region thereof in the short-axis direction is equal to or less than 1.5 mm generally has, for the incident angles, a tolerance range of −15° to −4°. With the re-imaging optical system 1, it is possible to realize oblique incident angles of −15° to −4° with respect to the image-acquisition surface 3a. Furthermore, by satisfying conditional expression (3), it is possible to form the subject image received via the image guide 2 at the solid-state image-acquisition device 3 at an appropriate magnification, from 0.5 times to 2 times to be specific.

In the case in which fR1/L is equal to or less than −0.5, the oblique incident angle with respect to the solid-state image-acquisition device is decreased, which makes it difficult to maintain the compatibility with a compact solid-state image-acquisition device having oblique incidence characteristics. On the other hand, in the case in which fR1/L is equal to or greater than −0.15, it is difficult to reduce the overall length.

It is more preferable that the re-imaging optical system 1 according to this embodiment satisfy conditional expression (3') below:

$$0.25 < |FB|/|FF| < 2.65. \quad (3')$$

When displaying an image on the monitor, because the image quality appears to be better when the image is compact, it is preferable to avoid excessive enlargement of the subject image in the re-imaging optical system 1 from the viewpoint of image quality. By satisfying conditional expression (3'), it is possible to form the subject image transmitted through the image guide 2 at the solid-state image-acquisition device 3 at a magnification of 0.5 times to 1.62 times.

EXAMPLES

Next, Examples 1 to 6 of this embodiment described above will be described below with reference to FIGS. 2 to 13.
In lens data described for the individual Examples, r is the radius of curvature (mm), d is the surface spacing (mm), ne is the refractive index at the e line, Vd is the Abbe number at the d line, OBJ (surface number=0) is the object surface, IMG is the image surface, and S is the aperture stop.

Example 1

Figure 2:
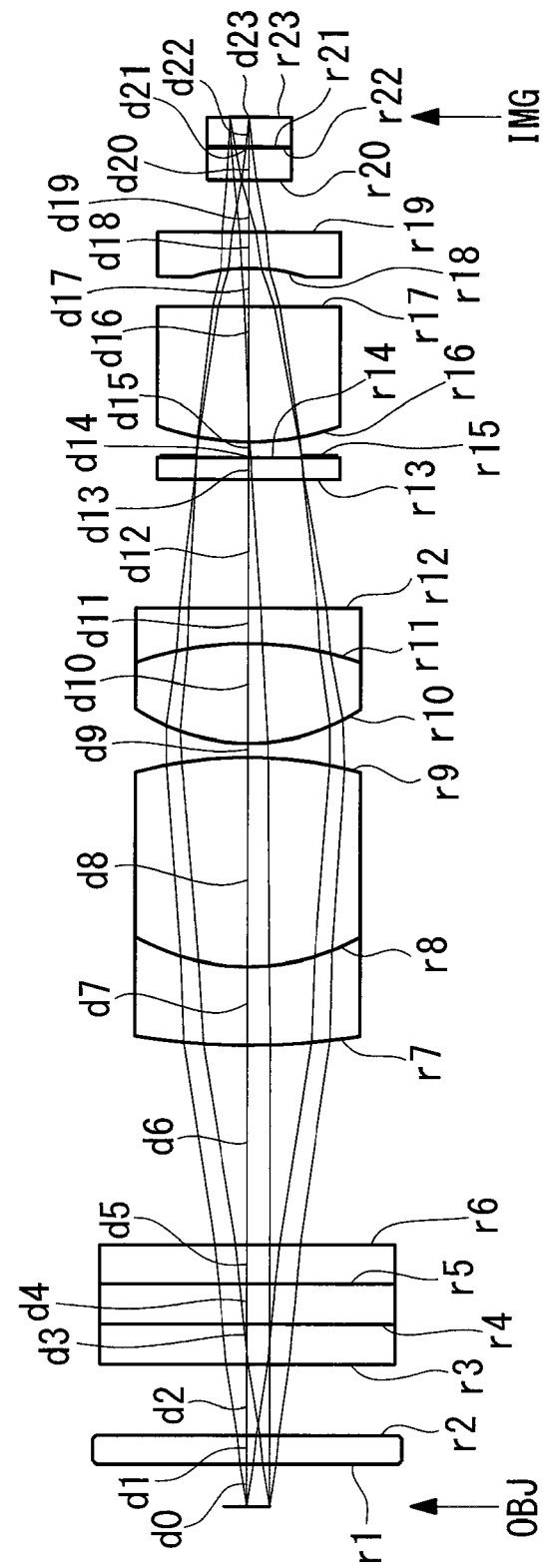
FIG. 2 is a sectional lens diagram showing the overall configuration of a re-imaging optical system according to Example 1 of the present invention.

FIG. 2 shows the overall configuration of a re-imaging optical system according to Example 1 of the present invention, and FIGS. 3A to 3F show aberration diagrams thereof. The re-imaging optical system according to this Example has the same lens configuration as that of the above-described re-imaging optical system in FIG. 1.

| Lens data | | | | |
|---|---|---|---|---|
| surface number | r | d | ne | Vd |
| OBJ | ∞ | 0.6000 | 1. | |
| 1 | ∞ | 0.4000 | 1.51825 | 64.14 |
| 2 | ∞ | 1.0000 | 1. | |
| 3 | ∞ | 0.5600 | 1.55098 | 45.79 |
| 4 | ∞ | 0.5600 | 1.55098 | 45.79 |
| 5 | ∞ | 0.5600 | 1.55098 | 45.79 |
| 6 | ∞ | 2.8000 | 1. | |
| 7 | 9.748 | 1.1100 | 1.85504 | 23.78 |
| 8 | 3.281 | 2.9300 | 1.67340 | 47.23 |
| 9 | −6.202 | 0.2000 | 1. | |
| 10 | 2.920 | 1.4000 | 1.48915 | 70.23 |
| 11 | −4.846 | 0.5000 | 1.88815 | 40.76 |
| 12 | ∞ | 1.8000 | 1. | |
| 13 | ∞ | 0.3000 | 1.52300 | 66.54 |
| 14(S) | ∞ | 0.0300 | 1. | |
| 15 | ∞ | 0.1900 | 1. | |
| 16 | 3.853 | 1.9000 | 1.88815 | 40.76 |
| 17 | ∞ | 0.5300 | 1. | |
| 18 | −2.762 | 0.5000 | 1.88815 | 40.76 |
| 19 | ∞ | 0.7300 | 1. | |
| 20 | ∞ | 0.4500 | 1.51825 | 64.14 |
| 21 | ∞ | 0.0200 | 1.51190 | 64.05 |
| 22 | ∞ | 0.4000 | 1.61350 | 50.49 |
| 23 | ∞ | 0.0073 | 1. | |
| IMG | ∞ | 0.0000 | | |

Example 2

Figure 4:
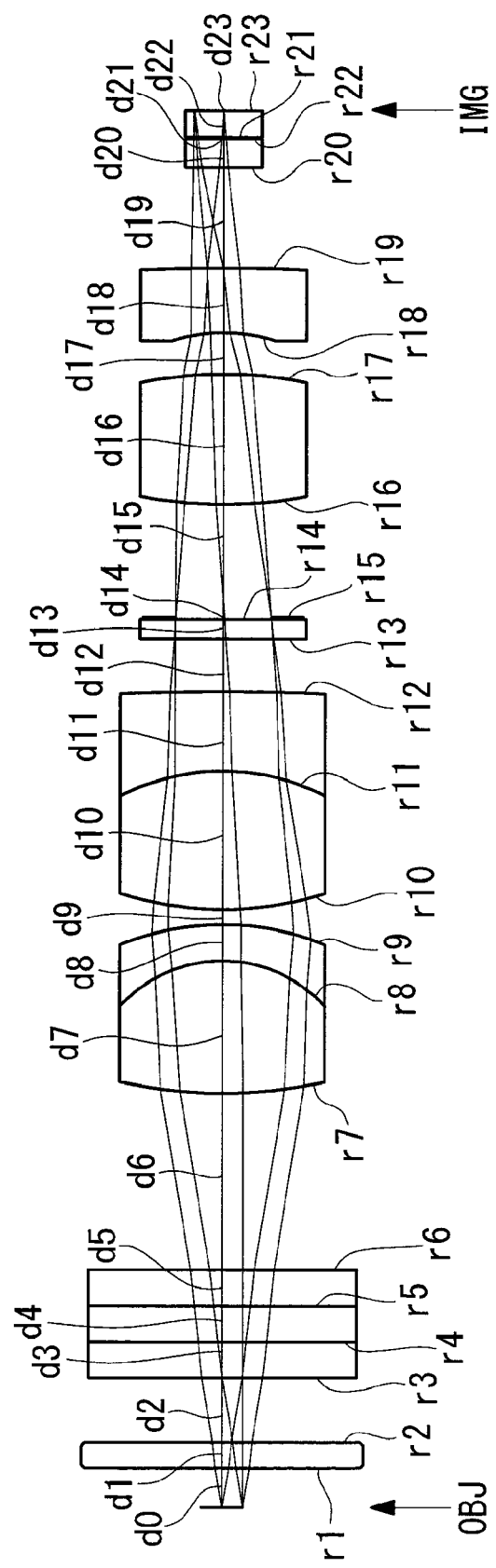
FIG. 4 is a sectional lens diagram showing the overall configuration of a re-imaging optical system according to Example 2 of the present invention.

FIG. 4 shows the overall configuration of a re-imaging optical system according to Example 2 of the present invention, and FIGS. 5A to 5F show aberration diagrams thereof. The re-imaging optical system according to this Example differs from the above-described re-imaging optical system in FIG. 1 in terms of the lens configuration in that the order of the negative lens and the positive lens that constitute the cemented lens Lc on the object side of the front group FG is reversed.

| Lens data | | | | |
|---|---|---|---|---|
| surface number | r | d | ne | Vd |
| OBJ | ∞ | 0.6000 | 1. | |
| 1 | ∞ | 0.4000 | 1.51825 | 64.14 |
| 2 | ∞ | 1.0000 | 1. | |
| 3 | ∞ | 0.5600 | 1.55098 | 45.79 |
| 4 | ∞ | 0.5600 | 1.55098 | 45.79 |
| 5 | ∞ | 0.5600 | 1.55098 | 45.79 |
| 6 | ∞ | 2.7125 | 1. | |
| 7 | 7.589 | 2.0453 | 1.67340 | 47.23 |
| 8 | −2.182 | 0.5626 | 1.81264 | 25.42 |
| 9 | −4.340 | 0.2371 | 1. | |
| 10 | 5.258 | 2.1354 | 1.48915 | 70.23 |
| 11 | −3.579 | 1.2224 | 1.88815 | 40.76 |
| 12 | −39.690 | 0.8056 | 1. | |
| 13 | ∞ | 0.3000 | 1.52300 | 66.54 |
| 14(S) | ∞ | 0.0300 | 1. | |
| 15 | ∞ | 1.7368 | 1. | |
| 16 | 7.000 | 2.0090 | 1.88815 | 40.76 |
| 17 | −6.754 | 0.6373 | 1. | |
| 18 | −2.633 | 0.9805 | 1.88815 | 40.76 |
| 19 | −28.069 | 1.5354 | 1. | |
| 20 | ∞ | 0.4500 | 1.51825 | 64.14 |
| 21 | ∞ | 0.0200 | 1.51190 | 64.05 |
| 22 | ∞ | 0.4000 | 1.61350 | 50.49 |
| 23 | ∞ | 0.0002 | 1. | |
| IMG | ∞ | 0.0000 | | |

Example 3

Figure 6:
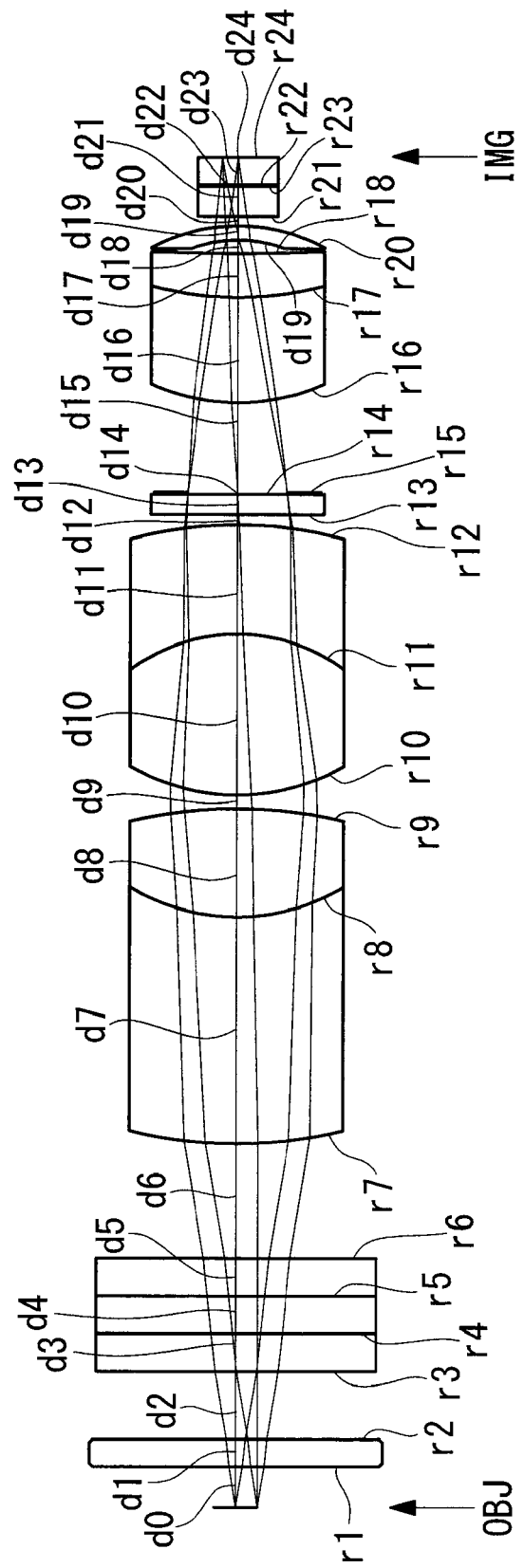
FIG. 6 is a sectional lens diagram showing the overall configuration of a re-imaging optical system according to Example 3 of the present invention.

FIG. 6 shows the overall configuration of a re-imaging optical system according to Example 3 of the present invention, and FIGS. 7A to 7F show various aberration diagrams thereof. The re-imaging optical system according to this Example differs from the above-described re-imaging optical system in FIG. 1 in terms of the lens configuration in that the positive lens Lp of the rear group RG is a cemented lens.

| Lens data | | | | |
|---|---|---|---|---|
| surface number | r | d | ne | Vd |
| OBJ | ∞ | 0.6000 | 1. | |
| 1 | ∞ | 0.4000 | 1.51825 | 64.14 |
| 2 | ∞ | 1.0000 | 1. | |
| 3 | ∞ | 0.5600 | 1.55098 | 45.79 |
| 4 | ∞ | 0.5600 | 1.55098 | 45.79 |
| 5 | ∞ | 0.5600 | 1.55098 | 45.79 |
| 6 | ∞ | 1.6984 | 1. | |
| 7 | 6.693 | 3.3439 | 1.85504 | 23.78 |
| 8 | 3.130 | 1.6007 | 1.67340 | 47.23 |
| 9 | −6.940 | 0.2000 | 1. | |
| 10 | 3.222 | 2.3802 | 1.48915 | 70.23 |
| 11 | −2.725 | 1.6046 | 1.88815 | 40.76 |
| 12 | −6.216 | 0.1500 | 1. | |
| 13 | ∞ | 0.3000 | 1.52300 | 66.54 |
| 14(S) | ∞ | 0.0300 | 1. | |
| 15 | ∞ | 1.3136 | 1. | |
| 16 | 3.227 | 1.5533 | 1.88815 | 40.76 |
| 17 | 5.003 | 0.6479 | 1.48915 | 70.23 |
| 18 | 35.520 | 0.1983 | 1. | |
| 19 | −1.993 | 0.2111 | 1.88815 | 40.76 |
| 20 | −2.758 | 0.1299 | 1. | |
| 21 | ∞ | 0.4500 | 1.51825 | 64.14 |
| 22 | ∞ | 0.0200 | 1.51190 | 64.05 |
| 23 | ∞ | 0.4000 | 1.61350 | 50.49 |
| 24 | ∞ | 0.0000 | 1. | |
| IMG | ∞ | 0.0000 | | |

Example 4

Figure 8:
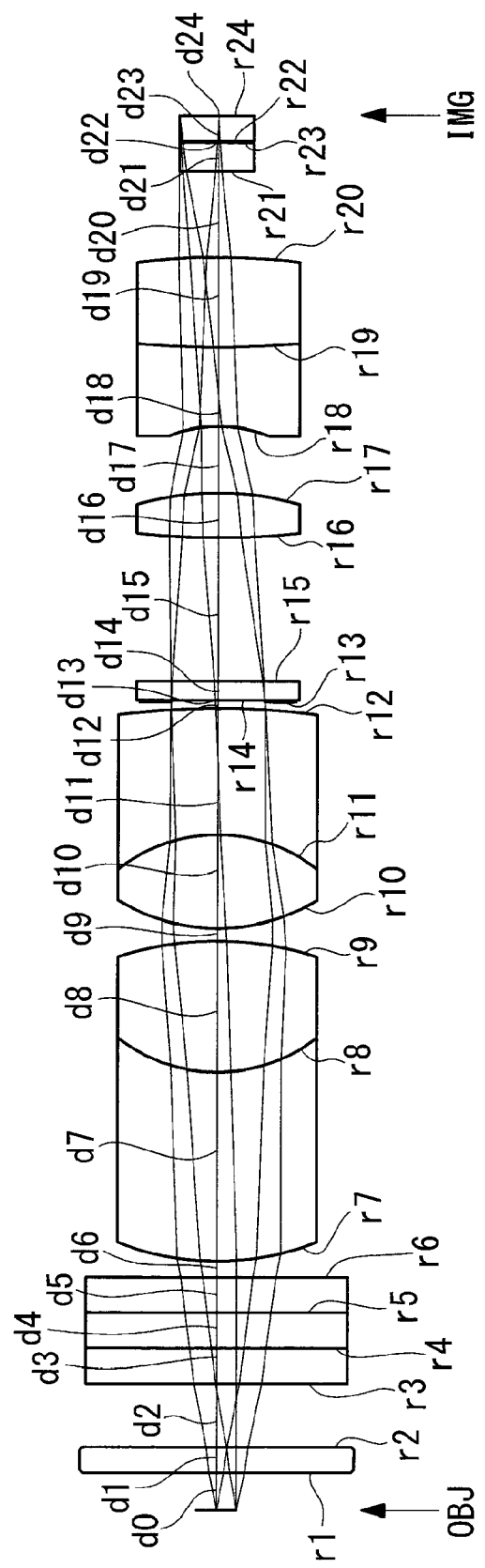
FIG. 8 is a sectional lens diagram showing the overall configuration of a re-imaging optical system according to Example 4 of the present invention.

FIG. 8 shows the overall configuration of a re-imaging optical system according to Example 4 of the present invention, and FIGS. 9A to 9F show various aberration diagrams thereof. The re-imaging optical system according to this Example differs from the above-described re-imaging optical system in FIG. 1 in terms of the lens configuration in that the negative lens Ln of the rear group RG is a cemented lens.

| Lens data | | | | |
|---|---|---|---|---|
| surface number | r | d | ne | Vd |
| OBJ | ∞ | 0.6000 | 1. | |
| 1 | ∞ | 0.4000 | 1.51825 | 64.14 |
| 2 | ∞ | 1.0000 | 1. | |
| 3 | ∞ | 0.5600 | 1.55098 | 45.79 |
| 4 | ∞ | 0.5600 | 1.55098 | 45.79 |
| 5 | ∞ | 0.5600 | 1.55098 | 45.79 |
| 6 | ∞ | 0.2434 | 1. | |
| 7 | 4.394 | 3.0001 | 1.85504 | 23.78 |
| 8 | 2.615 | 2.0718 | 1.67340 | 47.23 |
| 9 | −5.176 | 0.2002 | 1. | |
| 10 | 3.127 | 1.4781 | 1.48915 | 70.23 |
| 11 | −2.597 | 2.0013 | 1.88815 | 40.76 |
| 12 | −12.195 | 0.1000 | 1. | |
| 13(S) | ∞ | 0.0300 | 1. | |
| 14 | ∞ | 0.3000 | 1.52300 | 66.54 |
| 15 | ∞ | 2.2556 | 1. | |
| 16 | 12.376 | 0.7065 | 1.88815 | 40.76 |
| 17 | −4.700 | 1.0451 | 1. | |
| 18 | −2.222 | 1.2465 | 1.88815 | 40.76 |
| 19 | 14.581 | 1.4187 | 1.85504 | 23.78 |
| 20 | −10.007 | 1.3433 | 1. | |
| 21 | ∞ | 0.4500 | 1.51825 | 64.14 |
| 22 | ∞ | 0.0200 | 1.51190 | 64.05 |
| 23 | ∞ | 0.4000 | 1.61350 | 50.49 |
| 24 | ∞ | −0.0007 | 1. | |
| IMG | ∞ | 0.0000 | | |

Example 5

Figure 10:
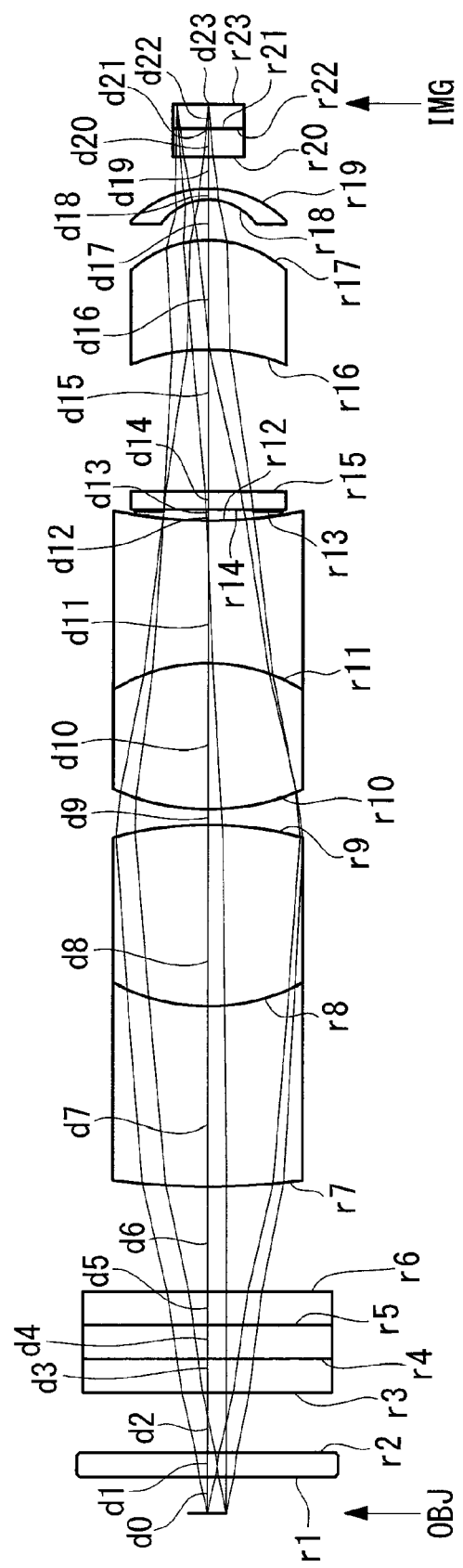
FIG. 10 is a sectional lens diagram showing the overall configuration of a re-imaging optical system according to Example 5 of the present invention.

FIG. 10 shows the overall configuration of a re-imaging optical system according to Example 5 of the present invention, and FIGS. 11A to 11F show various aberration diagrams thereof. The re-imaging optical system according to this Example has the same lens configuration as that of the above-described re-imaging optical system in FIG. 1.

| Lens data | | | | |
|---|---|---|---|---|
| surface number | r | d | ne | Vd |
| OBJ | ∞ | 0.6000 | 1. | |
| 1 | ∞ | 0.4000 | 1.51825 | 64.14 |
| 2 | ∞ | 1.0000 | 1. | |
| 3 | ∞ | 0.5600 | 1.55098 | 45.79 |
| 4 | ∞ | 0.5600 | 1.55098 | 45.79 |
| 5 | ∞ | 0.5600 | 1.55098 | 45.79 |
| 6 | ∞ | 1.7384 | 1. | |
| 7 | 13.157 | 3.0014 | 1.85504 | 23.78 |
| 8 | 3.480 | 3.0012 | 1.88815 | 40.76 |
| 9 | −6.193 | 0.2612 | 1. | |
| 10 | 4.093 | 2.4289 | 1.64254 | 60.08 |
| 11 | −3.075 | 2.3560 | 1.88815 | 40.76 |
| 12 | 8.542 | 0.1500 | 1. | |
| 13(S) | ∞ | 0.0300 | 1. | |
| 14 | ∞ | 0.3000 | 1.52300 | 66.54 |
| 15 | ∞ | 2.3364 | 1. | |
| 16 | −3.500 | 1.8072 | 1.88815 | 40.76 |
| 17 | −1.937 | 0.6716 | 1. | |
| 18 | −0.989 | 0.1813 | 1.64268 | 44.87 |
| 19 | −1.845 | 0.5179 | 1. | |
| 20 | ∞ | 0.4500 | 1.51825 | 64.14 |
| 21 | ∞ | 0.0200 | 1.51190 | 64.05 |
| 22 | ∞ | 0.4000 | 1.61350 | 50.49 |
| 23 | ∞ | −0.0003 | 1. | |
| IMG | ∞ | 0.0000 | | |

Example 6

Figure 12:
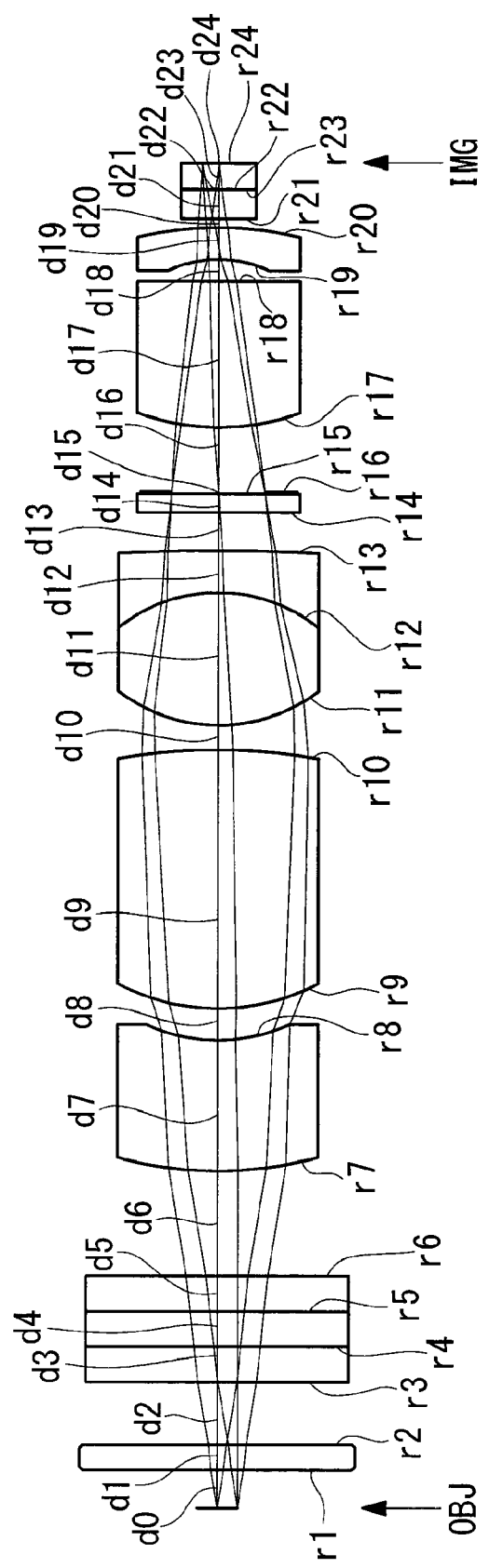
FIG. 12 is a sectional lens diagram showing the overall configuration of a re-imaging optical system according to Example 6 of the present invention.

FIG. 12 shows the overall configuration of a re-imaging optical system according to Example 6 of the present invention, and FIGS. 13A to 13F show various aberration diagrams thereof. The re-imaging optical system according to this Example differs from the above-described re-imaging optical system in FIG. 1 in terms of the lens configuration in that the first group G1 of the front group FG is formed of two single lenses.

| Lens data | | | | |
|---|---|---|---|---|
| surface number | r | d | ne | Vd |
| OBJ | ∞ | 0.6000 | 1. | |
| 1 | ∞ | 0.4000 | 1.51825 | 64.14 |
| 2 | ∞ | 1.0000 | 1. | |
| 3 | ∞ | 0.5600 | 1.55098 | 45.79 |
| 4 | ∞ | 0.5600 | 1.55098 | 45.79 |
| 5 | ∞ | 0.5600 | 1.55098 | 45.79 |
| 6 | ∞ | 1.6510 | 1. | |
| 7 | 6.267 | 2.0660 | 1.65222 | 33.79 |
| 8 | 2.727 | 0.5000 | 1. | |
| 9 | 3.427 | 4.0851 | 1.73234 | 54.68 |
| 10 | −9.226 | 0.3895 | 1. | |
| 11 | 2.674 | 2.0850 | 1.48915 | 70.23 |
| 12 | −2.582 | 0.6619 | 1.88815 | 40.76 |
| 13 | −29.581 | 0.6000 | 1. | |
| 14 | ∞ | 0.3000 | 1.52300 | 66.54 |
| 15(S) | ∞ | 0.0300 | 1. | |
| 16 | ∞ | 1.0138 | 1. | |
| 17 | 3.948 | 2.2918 | 1.88815 | 40.76 |
| 18 | −178.534 | 0.3300 | 1. | |
| 19 | −1.989 | 0.5059 | 1.88815 | 40.76 |
| 20 | −5.478 | 0.1366 | 1. | |
| 21 | ∞ | 0.4500 | 1.51825 | 64.14 |
| 22 | ∞ | 0.0200 | 1.51190 | 64.05 |
| 23 | ∞ | 0.4000 | 1.61350 | 50.49 |
| 24 | ∞ | 0.0000 | 1. | |
| IMG | ∞ | 0.0000 | | |

With regard to the above-described Examples 1 to 6, Table 1 shows values from conditional expressions (1) to (3), the incident angle (degree) with respect to the image-acquisition surface, and the size (mm) of the image-acquisition region of a presumed solid-state image-acquisition device. The incident angle is an angle whose absolute value is the maximum among the angles formed between the rays incident on the image-acquisition surface and the optical axis. The dimension of the image-acquisition region is the dimension of a rectangular image-acquisition region in the short-axis direction. Furthermore, the focal distance fF (mm) of the front group FG, the focal distance fR (mm) of the rear group RG, and the magnification of the re-imaging optical system 1 are also shown for reference.

TABLE 1

|  |  | EXAMPLE 1 | EXAMPLE 2 | EXAMPLE 3 | EXAMPLE 4 | EXAMPLE 5 | EXAMPLE 6 |
|---|---|---|---|---|---|---|---|
| fF |  | 4.43 | 4.31 | 4.47 | 4.00 | 3.54 | 4.34 |
| fR |  | 43.82 | 43.26 | 7.82 | 28.18 | 52.88 | 21.74 |
| fR1 |  | −3.11 | −3.33 | −9.29 | −3.73 | −3.62 | −3.77 |
| f |  | 2.95 | 3.33 | 4.32 | 3.72 | 4.14 | 3.30 |
| L |  | 19.48 | 21.50 | 19.91 | 21.99 | 23.33 | 21.20 |
| CONDITIONAL EXPRESSION | (1) fR1/f | −1.053 | −1.000 | −2.150 | −1.003 | −0.874 | −1.142 |
|  | (2) fR1/L | −0.160 | −0.155 | −0.467 | −0.170 | −0.155 | −0.178 |
|  | (3) \|FB\|/\|FF\| | 0.722 | 2.015 | 0.536 | 3.700 | 2.449 | 0.680 |
| INCIDENT ANGLE |  | −6.31 | −5.60 | −4.30 | −5.02 | −5.09 | −5.63 |
| SIZE OF IMAGE-ACQUISITION REGION |  | 0.8 | 1.3 | 0.7 | 1.8 | 1.5 | 0.8 |
| MAGNIFICATION |  | 0.849 | 1.419 | 0.730 | 1.923 | 1.570 | 0.825 |

REFERENCE SIGNS LIST 1 re-imaging optical system
2 image guide
3 solid-state image-acquisition device
3a image-acquisition surface
FG front group
RG rear group
G1 first group
G2 second group
Lc cemented lens
Lp positive lens
Ln negative lens
S aperture stop
OBJ object surface
IMG image surface

The invention claimed is:

1. A re-imaging optical system that is provided between an image guide and a solid-state image-acquisition device and that re-forms an image transmitted through the image guide at the solid-state image-acquisition device,
the re-imaging optical system being an object side telecentric optical system and comprising:
a front group;
an aperture stop; and
a rear group, in this order from an object side,
wherein the front group has a positive refractive power as a whole,
the rear group is composed of two groups that are a positive lens disposed on the object side and a negative lens disposed on an image side, and has a positive refractive power as a whole,
each of the positive lens and the negative lens is formed of a single lens or a cemented lens, and
conditional expressions (1) and (2) below are satisfied:

$$-2.2 < fR1/f < -0.79, \quad (1)$$

$$-0.5 < fR1/L < -0.15, \quad (2)$$

where fR1 is a focal distance of the negative lens, f is a focal distance of an entire system, and L is a total length from an object surface to an image surface.

2. The re-imaging optical system according to claim 1, wherein each of the positive lens and the negative lens is formed of a single lens.

\* \* \* \* \*